US008799953B2

(12) United States Patent  (10) Patent No.: US 8,799,953 B2
Mehta et al.  (45) Date of Patent: Aug. 5, 2014

(54) MEDIA CONTENT DISTRIBUTION SYSTEMS AND METHODS

(75) Inventors: Japan A. Mehta, Coppell, TX (US); Shafiq Kassam, Lewisville, TX (US); Shahzaib Zafar, Coppell, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 955 days.

(21) Appl. No.: 12/549,037

(22) Filed: Aug. 27, 2009

(65) Prior Publication Data

US 2011/0055022 A1  Mar. 3, 2011

(51) Int. Cl.
 *H04N 7/173* (2011.01)
 *H04N 21/6405* (2011.01)
 *H04N 21/81* (2011.01)
 *G06Q 30/02* (2012.01)
 *H04N 21/262* (2011.01)
 *H04N 21/4223* (2011.01)

(52) U.S. Cl.
 CPC ....... *H04N 7/17318* (2013.01); *H04N 21/6405* (2013.01); *H04N 21/812* (2013.01); *G06Q 30/0275* (2013.01); *H04N 21/26233* (2013.01); *G06Q 30/02* (2013.01); *H04N 21/4223* (2013.01)
 USPC ............... 725/45; 725/46; 725/115; 725/116; 725/32

(58) Field of Classification Search
 None
 See application file for complete search history.

(56) References Cited

U.S. PATENT DOCUMENTS

| 6,744,926 | B1 * | 6/2004 | Nishigaki ..................... 382/239 |
| 6,774,926 | B1 * | 8/2004 | Ellis et al. .................. 348/14.01 |
| 2003/0020744 | A1 * | 1/2003 | Ellis et al. ..................... 345/723 |
| 2007/0136753 | A1 * | 6/2007 | Bovenschulte et al. ......... 725/46 |
| 2007/0299976 | A1 | 12/2007 | Zafar et al. |
| 2008/0005761 | A1 * | 1/2008 | Repasi et al. .................... 725/13 |
| 2008/0064351 | A1 | 3/2008 | Landschaft et al. |
| 2008/0155588 | A1 | 6/2008 | Roberts et al. |
| 2008/0244645 | A1 | 10/2008 | Moon et al. |
| 2009/0259941 | A1 * | 10/2009 | Kennedy, Jr. ................. 715/719 |
| 2010/0070996 | A1 * | 3/2010 | Liao et al. ....................... 725/35 |

* cited by examiner

*Primary Examiner* — Cai Chen

(57) ABSTRACT

An exemplary method includes receiving end-user-provided media content with a first media content distribution platform subsystem, distributing the end-user-provided media content with the first media content distribution platform subsystem, receiving end-user-provided ratings of the distributed end-user-provided media content with the first media content distribution platform subsystem, selecting, by a platform linking subsystem, at least a subset of the end-user-provided media content based at least in part on the end-user-provided ratings, and distributing the selected at least a subset of the end-user-provided media content with a second media content distribution platform subsystem. In certain embodiments, the second media content distribution platform subsystem may comprise a subscriber television content distribution platform subsystem. In certain embodiments, the first media content distribution platform subsystem may comprise a World Wide Web media content distribution platform subsystem. Corresponding methods and systems are also disclosed.

17 Claims, 11 Drawing Sheets

MEDIA CONTENT DISTRIBUTION SYSTEMS AND METHODS

BACKGROUND INFORMATION

Distribution of media content has become widespread. This is due at least in part to the availability and accessibility of a variety of platforms for distributing media content. Unfortunately, it is not uncommon for a particular media content distribution platform to be isolated from and/or incompatible with another media content distribution platform. Accordingly, media content distributed via a particular distribution platform may be unavailable via another distribution platform.

For example, the advent of set-top boxes has provided users of such devices with access to a large number and variety of media content programs, services, and choices distributed via a subscriber television platform. A user may choose to experience a variety of broadcast television programs, pay-per-view services, video-on-demand programming, Internet services, and audio programming with a set-top box. However, certain media content distributed via one or more other media content distribution platforms has remained inaccessible to set-top boxes and/or unavailable through a particular service accessed by set-top boxes.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
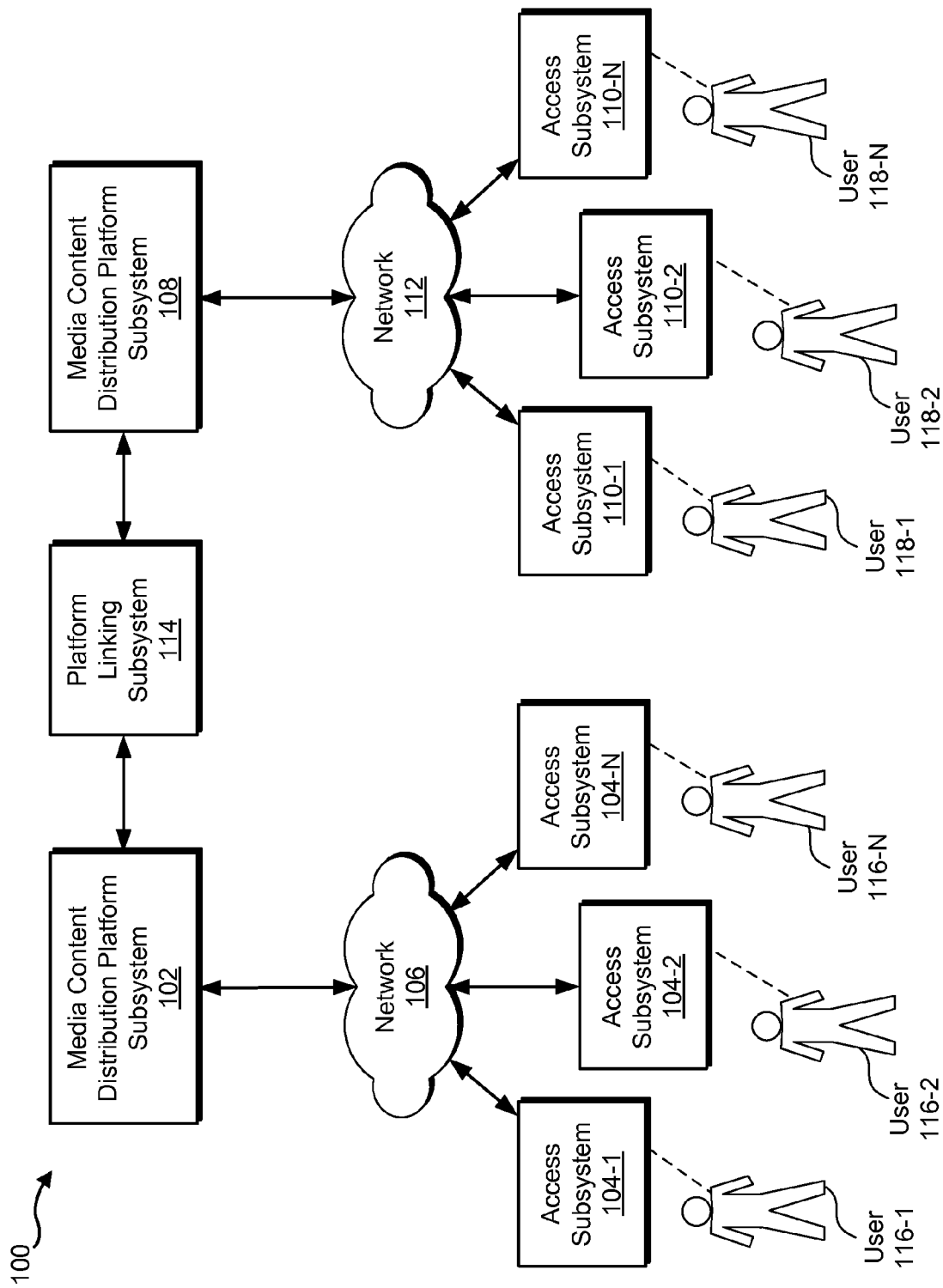
FIG. 1 illustrates an exemplary media content distribution system.

Exemplary media content distribution systems and methods are described herein. As described in more detail below, media content, such as end-user-generated content, distributed via a first media content distribution platform (e.g., a World Wide Web platform) may be selected and published to a second media content distribution platform (e.g., a subscriber television content distribution platform), which may distribute the selected media content. As an example, select media content distributed via a first media content distribution platform may be identified based at least in part on end-user-provided ratings of the media content. The selected media content may be published to a second media content distribution platform, which may distribute the selected media content. Accordingly, media content distributed via one media content distribution platform may be rated by one or more end users, and top-rated media content may be selected and distributed via another media content distribution platform.

For example, an exemplary method includes receiving end-user-provided media content with a first media content distribution platform subsystem, distributing the end-user-provided media content with the first media content distribution platform subsystem, receiving end-user-provided ratings of the end-user-provided media content with the first media content distribution platform subsystem, selecting, by a platform linking subsystem, at least a subset of the end-user-provided media content based at least in part on the end-user-provided ratings, and distributing the selected at least a subset of the end-user-provided media content with a second media content distribution platform subsystem. In certain embodiments, the second media content distribution platform subsystem may comprise a subscriber television content distribution platform subsystem. In certain embodiments, the first media content distribution platform subsystem may comprise a World Wide Web media content distribution platform subsystem.

As used herein, the term "media content" may refer generally to any content that may be accessed and/or presented by a media content access subsystem for experiencing by a user of the media content access subsystem. The term "media content instance" as used herein may refer generally to any television program, on-demand media program, pay-per-view media program, broadcast media program (e.g., broadcast television program), multicast media program, narrowcast media program, IPTV content, video, video clip, movie, audio clip, song, or any segment, component, or combination of these or other forms of media content that may be viewed or otherwise experienced by a user. The term "end-user-provided media content" refers to any media content provided by an end user of a media content access subsystem and/or a media content distribution service accessed via the access subsystem.

As used herein, the term "media content rating" may refer generally to any data indicative of (e.g., quantifying) a rating of media content. The term "end-user-provided media content rating" or "end-user-provided rating" refers to any data indicative of a media content rating provided by an end user of a media content access subsystem and/or a media content distribution service accessed via the access subsystem.

Exemplary media content distribution systems and methods will now be described with reference to the accompanying drawings.

FIG. 1 illustrates an exemplary media content distribution system 100 (or simply "system 100"). System 100 may include a first media content distribution platform subsystem 102 (or simply "distribution subsystem 102") in communication with one or more media content access subsystems 104 (e.g., media content access subsystems 104-1 through 104-N) via a network 106, a second media content distribution platform subsystem 108 (or simply "distribution subsystem 108") in communication with one or more media content access subsystems 110 (e.g., media content access subsystems 110-1 through 110-N) via a network 112, and a platform linking subsystem 114 in communication with distribution subsystem 102 and distribution subsystem 108.

Each media content access subsystem 104 (or simply "access subsystem 104") may be associated with one or more users, which in certain embodiments may be subscribers to or end users of one or more services (e.g., a media content distribution service) provided by distribution subsystem 102 over network 106. As an example, FIG. 1 shows users 116-1, 116-2, and 116-N (collectively "users 116") as being associated with access subsystems 104-1, 104-2, and 104-N, respectively. Each media content access subsystem 110 (or simply "access subsystem 110") may be similarly associated with one or more users, which in certain embodiments may be subscribers to or end users of one or more services (e.g., a media content distribution service) provided by distribution subsystem 108 over network 112. As an example, FIG. 1 shows users 118-1, 118-2, and 118-N (collectively "users 118") as being associated with access subsystems 110-1, 110-2, and 110-N, respectively.

The exemplary users 116 and users 118 and their particular associations with access subsystems 104 and access subsystems 110 are shown for illustrative purposes. Other user associations with access subsystems 104 and 110 may be defined in system 100. For example, while FIG. 1 shows separate sets of users 116 and 118 associated with separate access subsystems 104 and 110 configured to access services provided by distribution subsystems 102 and 108, respectively, in some examples, a particular user or access subsystem may be able to access services provided by either of the distribution subsystems 102 and 108. For instance, user 116-1 may utilize access subsystem 104-1 and/or access subsystem 110-1 to access a service provided by distribution subsystem 102 via network 106 and a service provided by distribution subsystem 108 via network 112.

In certain embodiments, system 100 or one or more components of system 100 may include any computer hardware and/or computer-implemented instructions (e.g., software), or combinations of computer-implemented instructions and hardware, configured to perform one or more of the processes described herein. In particular, it should be understood that one or more components of system 100 may be implemented on one physical computing device or may be implemented on more than one physical computing device. Accordingly, one or more components of system 100 may include any one of a number of computing devices, and may employ any of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

The components of system 100 may communicate one with another using any suitable communication technologies, devices, networks, media, and protocols supportive of data communications. For example, distribution subsystem 102 and access subsystems 104 may communicate over network 106 and distribution subsystem 108 and access subsystems 110 may communicate over network 112 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 and/or network 112 may include one or more networks or types of networks (and communication links thereto) capable of carrying communications, media content, and/or data signals between distribution subsystem 102 and access subsystems 104 and/or distribution subsystem 108 and access subsystems 110. For example, network 106 and/or network 112 may include, without limitation, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying media content, data, and/or communications signals between components of system 100. Communications between components of system 100 may be transported using any one of the above-listed networks, or any combination or sub-combination of the above-listed networks.

In certain embodiments, network 106 and network 112 may comprise separate networks. For example, as described in more detail further below, in certain examples network 106 may comprise at least a portion of the Internet, World Wide Web, and/or mobile phone network, and network 112 may comprise at least a portion of a subscriber television network.

While FIG. 1 shows network 106 and network 112 as separate networks, in some alternative examples, networks 106 and 112 may overlap and/or be integrated together into one or more common networks, including any of the networks listed above.

Platform linking subsystem 114 may communicate with distribution subsystem 102 and distribution subsystem 108 using any suitable communication technologies, devices, networks, media, and protocols supportive of data communications. In certain embodiments, platform linking subsystem 114 may be in direct communication with distribution subsystem 102 and/or distribution subsystem 108. In other embodiments, platform linking subsystem 114 may be in communication with distribution subsystem 102 and/or distribution subsystem 108 via network 106 and/or network 112.

Distribution subsystem 102 and distribution subsystem 108 may include and/or be configured to utilize separate and/or diverse media content distribution platforms to distribute media content. Diverse media content distribution platforms may include any media content distribution platforms supporting diverse media content formats, utilizing diverse media content delivery formats, networks, channels, and/or technologies, covering diverse geographic and/or user footprints, and/or communicating with diverse access subsystems. In certain embodiments, for example, distribution subsystem 102 may include and/or be configured to distribute media content over at least one of a World Wide Web, Internet, and mobile phone distribution platform, and distribution subsystem 108 may include and/or be configured to distribute media content over a different platform such as a subscriber television platform.

Platform linking subsystem 114 may be configured to provide a link between diverse media content distribution platforms. The link may be utilized to bridge select media content between diverse media content distribution platforms. For example, as described in more detail further below, platform linking subsystem 114 may be configured to access media content distributed by distribution subsystem 102 to one or more access subsystems 104, select at least a subset of the media content, and publish the selected media content for distribution by distribution subsystem 108 to one or more access subsystems 110.

While an exemplary media content distribution system 100 is shown in FIG. 1, the configuration of system 100 illustrated in FIG. 1 is not intended to be limiting. Additional or alternative configurations and/or media content distribution platforms may be used in other embodiments. In certain alternative embodiments, for example, platform linking subsystem 114 may be integrated within distribution subsystem 102 and/or distribution subsystem 108. Components of system 100 will not be described in additional detail.

Access subsystems 104 may be configured to request and/or receive data representative of media content from distribution subsystem 102 via network 106. Access subsystems 104 may process received media content, including presenting (e.g., playing back) the media content for experiencing by users 116.

Access subsystems 104 may be further configured to transmit (e.g., upload) data representative of end-user-provided media content to distribution subsystem 102 via network 106. The end-user-provided media content may include any media content provided (e.g., generated) by one or more end users such as one or more users 116 of access subsystems 104.

In certain embodiments, one or more access subsystems 104 may be configured to capture end-user-provided media content. For example, an access subsystem 104 may include a video camera configured to capture video content and/or an audio recorder configured to capture audio content. Access subsystem 104 may provide such captured end-user-provided media content to distribution subsystem 102 via network 106.

Access subsystems 104 may be further configured to generate metadata and/or receive user input defining metadata associated with end-user-provided media content. Access subsystems 104 may transmit such metadata to distribution subsystem 102. The metadata may include any information descriptive of or otherwise associated with the end-user-provided media content. Examples of metadata may include, without limitation, time data associated with one or more data operations (e.g., creating, capturing, modifying, receiving, and/or transmitting media content), location data associated with one or more data operations (e.g., a geographic location or network location at which media content is created and/or from which media content is transmitted), user data identifying one or more users 116 associated with media content (e.g., a user 116 who created, captured, modified, transmitted, received, accessed, or otherwise operated on or is owner of media content), media content type information (e.g., file type, media content genre, or other predefined category of media content), content transport information, source data associated with a source of media content (e.g., a user 116 from whom and/or an access subsystem 104 from which content is received), and playback time information (e.g., playback time duration) associated with media content.

Access subsystems 104 may be further configured to receive end-user-provided ratings of media content distributed by distribution subsystem 102. For example, one or more users 116 may provide input to one or more access subsystems 104 specifying one or more ratings of media content. Access subsystems 104 may receive and transmit such end-user-provided ratings of media content to distribution subsystem 102. Media content ratings may be in any format suitable for ranking (e.g., quantifying) media content instances with respect to one another. For example, a user 116 may provide a rating specifying a value within a predefined numerical range to be assigned to a media content instance. Accordingly, users 116 may utilize access subsystems 104 to rate and provide ratings for media content to distribution subsystem 102.

As an example of access subsystems 104 providing and accessing end-user-provided media content, a user 116-1 may utilize access subsystem 104-1 to create and upload a video clip to distribution subsystem 102 via network 106. Metadata associated with the video clip may also be uploaded to distribution subsystem 102. Distribution subsystem 102 may distribute the video clip to one or more access subsystems 104 for presentation to one or more users 116. For instance, a user 116-2 may utilize access subsystem 104-2 to transmit a request for the video clip to distribution subsystem 102 and receive data representative of the requested video clip from distribution subsystem 102 via network 106. Access subsystem 104-2 may present the video clip for experiencing by user 116-2. In addition, user 116-2 may utilize access subsystem 104-2 to provide a rating for the video clip. Access subsystem 104-2 may transmit data representative of the rating to distribution subsystem 102. One or more other users 116 may similarly access, experience, and rate the video clip.

Access subsystem 104 may include or be implemented on one or more devices configured to provide, access, and/or present media content as described above. Examples of such devices may include, without limitation, a computing device (e.g., a personal computer), a mobile device (e.g., a mobile phone), and any other media content processing device.

Distribution subsystem 102 may be configured to transmit and/or receive communication signals, media content, and/or data to/from access subsystems 104. In particular, distribution subsystem 102 may receive end-user-provided media content from and distribute end-user-provided media content to one or more access subsystems 104. Distribution subsystem 102 may also receive and distribute end-user-provided ratings of media content from/to one or more access subsystems 104.

Figure 2:
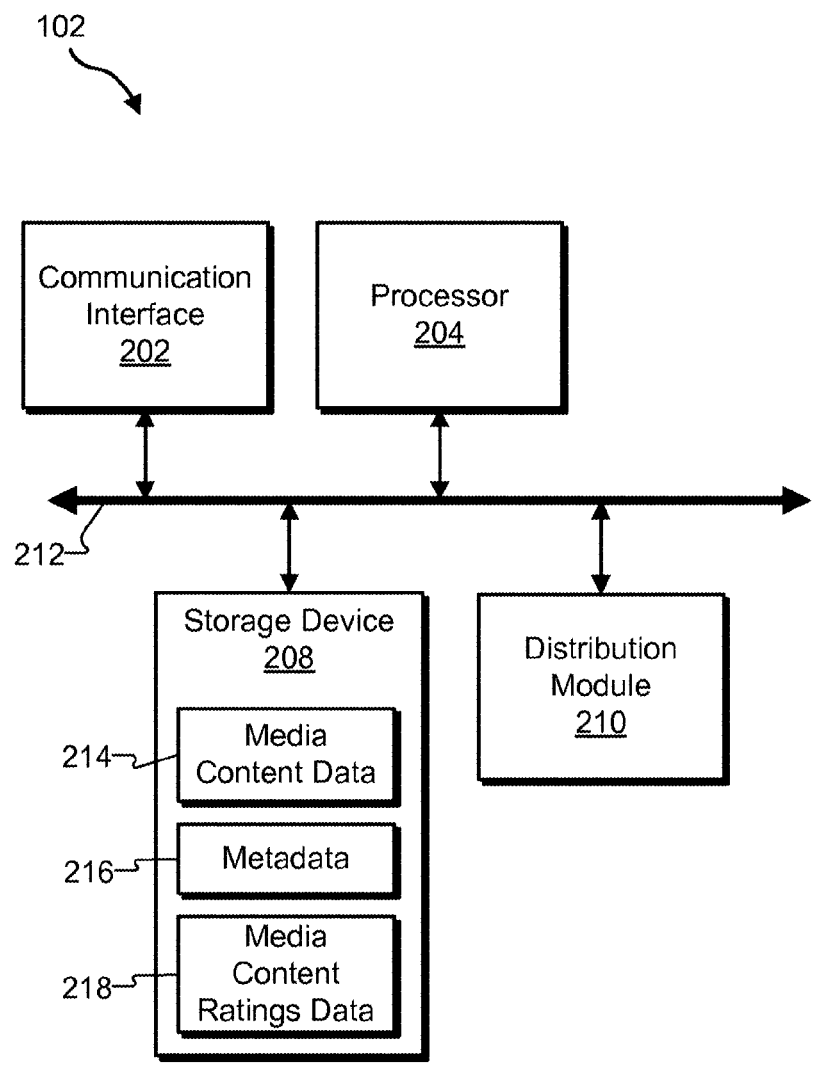
FIG. 2 illustrates exemplary components of a first media content distribution platform subsystem.

FIG. 2 illustrates exemplary components of distribution subsystem 102. As shown in FIG. 2, distribution subsystem 102 may include a communication interface 202, a processor 204, a storage device 208, and a distribution module 210 communicatively coupled one to another via a communication infrastructure 212. The components of distribution subsystem 102 may communicate with one another, including sending data to and receiving data from one another, using any suitable communication technologies. Moreover, the components of distribution subsystem 102 may be implemented on any computing device or combination of computing devices, such as one or more servers (e.g., media content servers, video servers, web servers, etc.).

While an exemplary implementation of distribution subsystem 102 is shown in FIG. 2, the components illustrated in FIG. 2 are not intended to be limiting. Additional or alternative components may be used in other embodiments. Components of the distribution subsystem 102 shown in FIG. 2 will now be described in additional detail.

Communication interface 202 may be configured to communicate with one or more computing devices, including access subsystems 104 and platform linking subsystem 114. In particular, communication interface 202 may be configured to transmit and/or receive communication signals, media content, and/or data to/from access subsystem 104. Examples of communication interface 202 may include, without limitation, a wired network interface (such as a network interface card), a wireless network interface (such as a wireless network interface card), a modem, a transmitter, a transceiver, and any other suitable interface.

Processor 204 generally represents any type or form of processing unit capable of processing data and/or interpreting, executing, and/or directing execution of one or more of the distribution subsystem instructions, processes, and/or operations described herein. Processor 204 may direct execution of operations in accordance with computer-executable instructions (e.g., one or more software applications) such as may be stored in storage device 208 or another computer-readable medium.

Storage device 208 may include one or more data storage media, devices, or configurations and may employ any type, form, and combination of data storage media and/or devices. For example, storage device 208 may include, without limitation, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 208. For example, media content data 214, metadata 216, and media content ratings data 218 (or simply "ratings data 218") may be stored within storage device 208. Media content data 214 may include any data representative of media content, including end-user-provided media content received from one or more access devices 104. Metadata 216 may include any data descriptive of or otherwise associated with media content data 214, including any of the examples of metadata described above. Ratings data 218 may include any data representative of ratings of media content, including end-user-provided ratings received from one or more access subsystems 104, as described above. In some examples, media content data 214, metadata 216, and ratings data 218 may be arranged in one or more databases and/or data libraries residing within storage device 208. In certain embodiments, ratings data 218 may be part of metadata 216.

Distribution module 210 may be configured to direct distribution subsystem 102 to maintain media content data 214, metadata 216, and ratings data 218 in storage device 208. In certain embodiments, the maintaining of media content data 214, metadata 216, and ratings data 218 may include receiving and aggregating end-user-provided media content, media content metadata, and media content ratings from various access subsystems 104 and/or users 116 of access subsystems 104. The media content, media content metadata, and media content ratings may be aggregated within one or more libraries of end-user-provided data stored in storage device 208. Accordingly, end-user-provided media content data 214, metadata 216, and/or ratings data 218 maintained in storage device 208 may be referred to as community-based data that has been received from one or more communities of access subsystems 104 and/or users 116.

Distribution module 210 may be further configured to selectively provide (e.g., transmit) media content data 214, metadata 216, and/or ratings data 218 for access by one or more access subsystems 104 via network 106. Accordingly, end-user-provided media content data 214, metadata 216, and/or ratings data 218 may be shared within communities of access subsystems 104 and/or users 116 of access subsystems 104.

In certain embodiments, distribution subsystem 102 may be configured to prompt one or more users 116 of access subsystems 104 to rate and/or vote for media content distributed by distribution subsystem 104. Such a prompt may in some examples indicate that a rating and/or a vote for media content may be used to select top-rated media content for distribution via another media content distribution platform such as a platform utilized by distribution subsystem 108. For example, a prompt may indicate that top-rated media content may be selected for distribution via a particular media content carrier channel and in a particular programming time slot of a media content transmission schedule utilized by distribution subsystem 108 as described further below.

As mentioned, platform linking subsystem 114 may be configured to access media content associated with distribution subsystem 102, select at least a subset of the media content, and publish the selected media content for distribution by distribution subsystem 108. To this end, platform linking subsystem 114 may access, retrieve a copy, and/or process media content data 214, metadata 216, and/or ratings data 218 maintained in storage device 208 of distribution subsystem 102.

Figure 3:
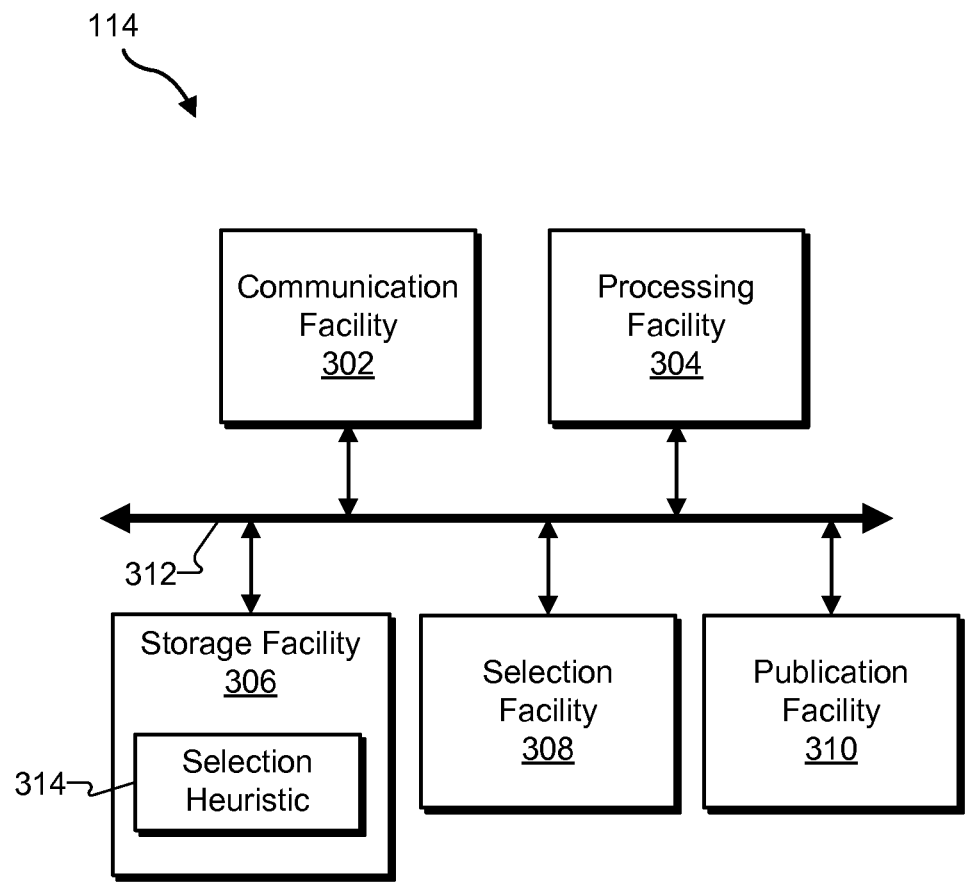
FIG. 3 illustrates exemplary components of a platform linking subsystem.

To help facilitate an understanding of platform linking subsystem 114, FIG. 3 illustrates exemplary components of platform linking subsystem 114. As shown in FIG. 3, platform linking subsystem 114 may include a communication facility 302, processing facility 304, storage facility 306, selection facility 308, and publication facility 310 communicatively coupled to one another via a communication infrastructure 312. The components of platform linking subsystem 114 may communicate with one another, including sending data to and receiving data from one another via communication infrastructure 312, using any suitable communication technologies.

While an exemplary implementation of platform linking subsystem 114 is shown in FIG. 3, the components illustrated in FIG. 3 are not intended to be limiting. Additional or alternative components may be used in other embodiments. Components of the platform linking subsystem 114 shown in FIG. 3 will now be described in additional detail.

Communication facility 302 may be configured to facilitate communication between platform linking subsystem 114 and distribution subsystems 102 and 108. In particular, communication facility 302 may be configured to transmit and/or receive communication signals, media content, and/or data to/from distribution subsystem 102 and/or distribution subsystem 108. Examples of communication facility 302 may include, without limitation, a wired network interface (such as a network interface card), a wireless network interface (such as a wireless network interface card), a modem, and any other suitable interface.

Processing facility 304 may include one or more processors and may be configured to execute and/or direct execution of one or more of the platform linking subsystem processes or operations described herein. Processing facility 304 may direct execution of operations in accordance with computer-executable instructions such as may be stored in storage facility 306 or another computer-readable medium.

Storage facility 306 may include one or more data storage media, devices, and/or configurations and may employ any type, form, and combination of data storage media and/or device. For example, storage facility 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage facility 306. In some examples, data may be arranged in one or more databases residing within storage facility 306.

Selection facility 308 may be configured to access media content distributed by distribution subsystem 102 and select at least a subset of the media content distributed by distribution subsystem 102 based one or more predefined selection conditions. Such conditions may be specified in a selection heuristic 314, which may be in the form of data and/or instructions stored in storage facility 306 as shown in FIG. 3. Selection facility 308 may maintain and apply selection heuristic 314 to media content distributed by distribution subsystem 102 to select at least a subset of the media content distributed by distribution subsystem 102. Examples of selecting at least a subset of media content distributed by distribution subsystem 102 are described in detail further below.

Publication facility 310 may be configured to publish the media content selected by selection facility 308 for distribution by distribution subsystem 108. Such publishing may include converting selected media content from one media content data format to another media content data format (e.g., from a data format supported by distribution subsystem 102 to a data format supported by distribution subsystem 108) and transmitting data representative of the selected media content to distribution subsystem 108 for distribution to one or more access subsystems 110.

In some examples, one or more of the facilities shown in FIG. 3 may be implemented at least in part as computing instructions (e.g., as one or more applications) residing within storage facility 306 or other computer-readable medium and configured to direct processing facility 304 to perform and/or direct one or more other components of platform linking subsystem 114 to perform one or more of the platform linking subsystem processes and/or operations described herein. In certain embodiments, for example, selection facility 308 and/or publication facility 310 may be implemented, at least in part, as computing instructions residing within storage facility 306 and configured to direct processing facility 304 and/or platform linking subsystem 114 to perform one or more of the platform linking processes and/or functions described herein.

Figure 4:
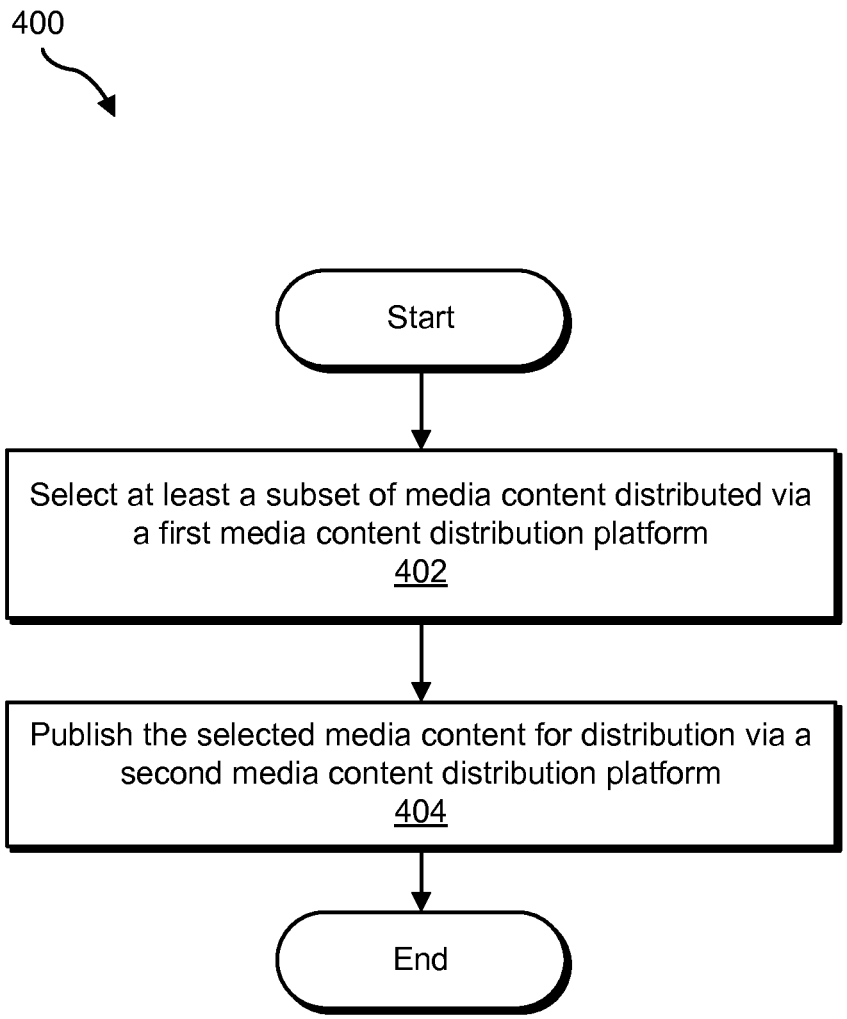
FIG. 4 illustrates an exemplary media content distribution method.

FIG. 4 illustrates an exemplary media content distribution method 400. While FIG. 4 illustrates exemplary steps according to one embodiment, other embodiments may omit, add to, reorder, and/or modify any of the steps shown in FIG. 4. In certain embodiments, one or more of the steps shown in FIG. 4 may be performed by platform linking subsystem 114.

In step 402, at least a subset of media content distributed via a first media current distribution platform is selected. For example, platform linking subsystem 114 may select at least a subset of media content distributed by distribution subsystem 102. In certain embodiments, the selected media content may be selected based at least in part on end-user-provided ratings of the media content distributed by distribution platform 102. For example, platform linking subsystem 114 may select a subset of media content having relatively higher-value end-user-provided ratings than a remainder of the media content, based on ratings data 218 associated with the media content. Such selected media content may be referred to as "top-rated" media content.

Additionally or alternatively to basing a selection of media content on end-user-provided ratings of the media content, platform linking subsystem 114 may be configured to base a selection of media content on one or more other predefined selection conditions. As mentioned, selection of the least a subset of media content distributed by distribution subsystem 102 may be based at least in part on selection heuristic 314, which may specify one or more predefined selection conditions to be used to identify and make selections. The conditions specified by selection heuristic 314 may be defined as may suit a particular embodiment and/or implementation of system 100. For example, one or more of the conditions specified by selection heuristic 314 may be tailored to suit one or more attributes and/or operations of distribution subsystem 108, as described in more detail further below.

Figure 5:
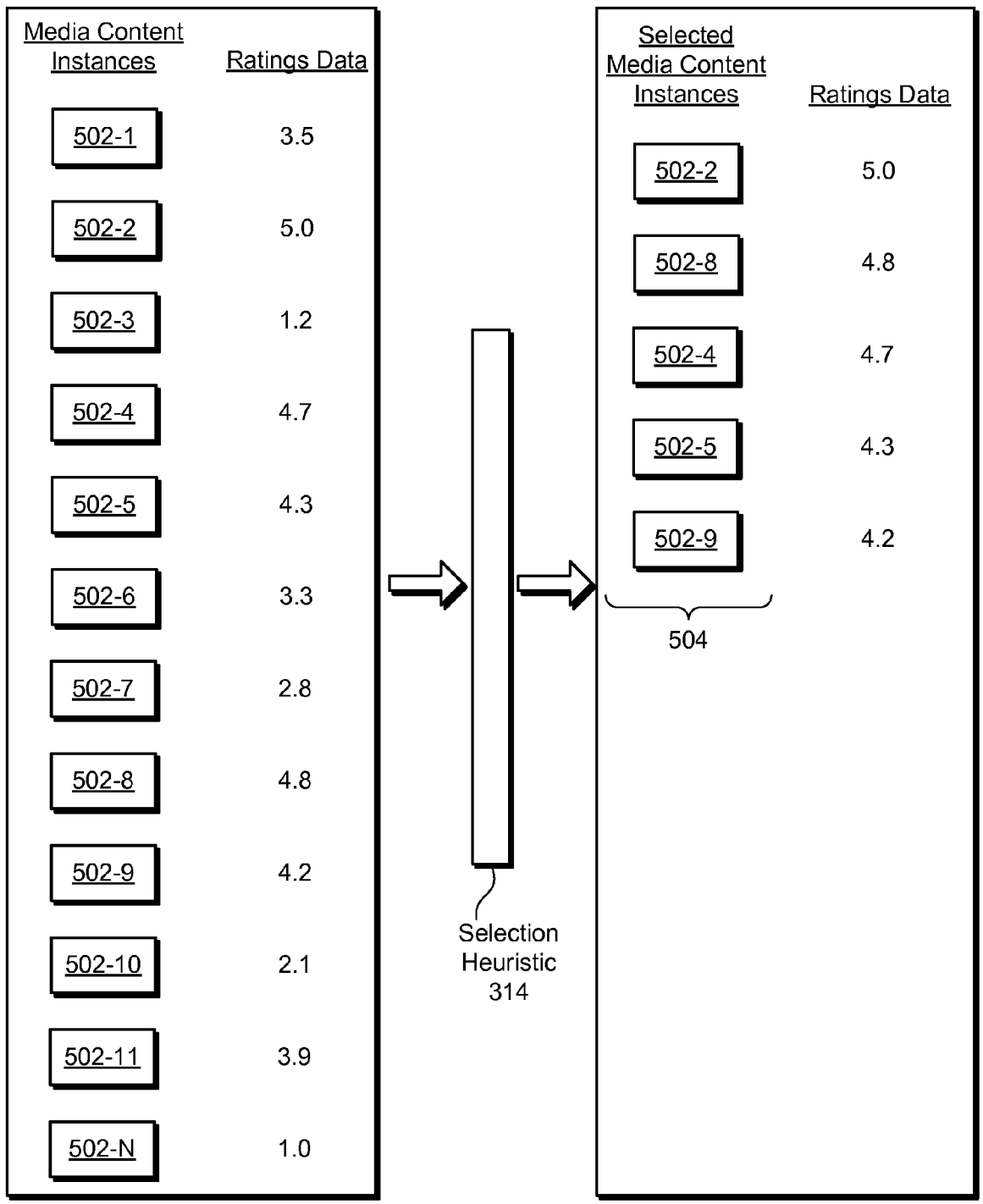
FIG. 5 illustrates an exemplary selection of a subset of media content distributed via a first media content distribution platform.

FIG. 5 illustrates an exemplary selection of a subset of media content distributed by distribution subsystem 102. The selection is based on selection heuristic 314. As shown in FIG. 5, media content distributed by distribution subsystem 102 may include a plurality of media content instances 502 (e.g., media content instances 502-1 through 502-N). FIG. 5 also shows ratings data 218 associated with media content instances 502. In the illustrated example, ratings data 218 includes numerical values within a numerical range (e.g., 0-5) indicating ratings of corresponding media content instances 502. The numerical values may specify averages of end-user-provided ratings for the media content instances. For example, a rating of "3.5" associated with media content instance 502-1 may specify an average value of end-user-provided ratings of media content instance 502-1.

Platform linking subsystem 114 may apply selection heuristic 314 to media content instances 502-1 through 502-N to select at least a subset of the media content instances 502-1 through 502-N based on one or more conditions specified by selection heuristic 314. In FIG. 5, application of selection heuristic 314 to media content instances 502-1 through 502-N produces a selected subset of the media content instances 502-1 through 502-N. The selected subset is indicated as reference numeral 504 in FIG. 5. In the illustrated example, the selected subset 504 of media content instances includes media content instances 502-2, 502-8, 502-4, 502-5, and 502-9. The remainder of media content instances 502-1 through 502-N is omitted from the selected subset 504.

Ratings data 218 for the selected subset 504 of media content instances is shown in FIG. 5. As illustrated, the selected media content instances 502-2, 502-8, 502-4, 502-5, and 502-9 may be sorted and ranked in accordance with the associated ratings data 218. Accordingly, the selected subset 504 of media content instances may represented a set of top-rated media content instances as rated by end-users 116 accessing media content distributed by distribution subsystem 102.

The selection of subset 504 and/or any other subset of media content instances 502 may be based on one or more conditions specified by selection heuristic 314. Such conditions may be applied in any suitable combination and/or order to select at least a subset of media content distributed by distribution subsystem 102. Examples of conditions that may be specified by selection heuristic 314 may include, without limitation, at least one location condition (e.g., a geographic location condition), at least one media content category condition (e.g., a media content genre condition), at least one time allotment condition (e.g., a maximum playback duration condition), at least one ratings condition (e.g., a minimum end-user-provided ratings condition), and any other suitable conditions for selecting a subset of media content distributed by distribution subsystem 102.

Figure 6:
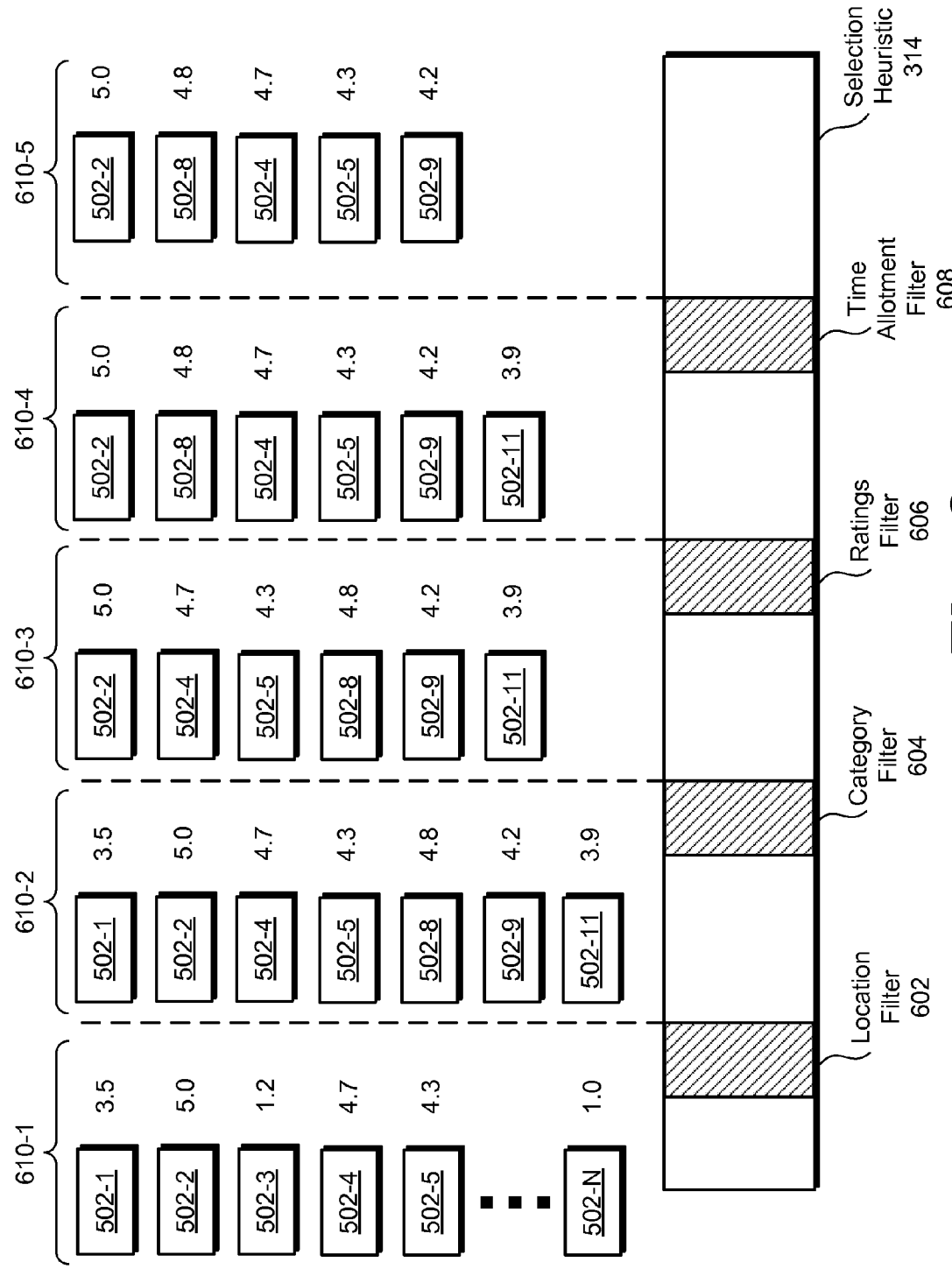
FIG. 6 illustrates an application of an exemplary selection heuristic to media content distributed via a first media content distribution platform to select a subset of the media content.

To help illustrate such selection conditions, FIG. 6 depicts an application of an exemplary selection heuristic 314 to media content distributed by distribution subsystem 102 to select a subset of the media content. As shown in FIG. 6, selection heuristic 314 may include a location filter 602, a category filter 604, a ratings filter 606, and a time allotment filter 608. Each of the filters may specify one or more conditions to be used to filter media content instances 502 to produce a selection of at least a subset of the media content instances 502. For example, the location filter 602 may specify at least one location condition (e.g., a geographic location condition), category filter 604 may specify at least one media content category condition (e.g., a media content genre condition), ratings filter 606 may specify at least one ratings condition (e.g., a minimum acceptable rating value), and time allotment filter 608 may specify at least one time allotment condition (e.g., a maximum playback time duration condition) to be used to select at least a subset of media content instances 502. The filters 602-608, including the combination and/or order of filters 602-608, in FIG. 6 are illustrative only. Other combinations, sub-combinations, and/or orders of filters may be used in other embodiments.

FIG. 6 illustrates an exemplary flow of a plurality of media content instances 502 through filters 602-608 of selection heuristic 314. As shown in FIG. 6, location filter 602 may be applied to a first set 610-1 of media content instances including media content instances 502-1 through 502-N to select a subset of the media content instances 502-1 through 502-N. The selected subset of media content instances 502-1 through 502-N produced by application of location filter 602 may be referred to as a second set 610-2 of media content instances. As shown in FIG. 6, the second set 610-2 of media content instances may include media content instances 502-1, 502-2, 502-4, 502-5, 502-8, 502-9, and 502-11.

The second set 610-2 of media content instances may include only media content instances associated with a particular location. For example, media content instances included in the second set 610-2 may be associated with a particular geographic location. As an example, location filter 602 may specify a location condition that may be applied to select only media content instances associated with a geographic area known as "New York City." This may help filter media content based on geographic relevance of the media content. For example, a particular user 118 may be interested in viewing media content created in New York City.

As shown in FIG. 6, category filter 604 may be applied to the second set 610-2 of media content instances to select a subset of the second set 610-2 of media content instances. The selected subset of the second set 610-2 of media content instances produced by application of category filter 604 may be referred to as a third set 610-3 of media content instances. As shown in FIG. 6, the third set 610-3 of media content instances may include media content instances 502-2, 502-4, 502-5, 502-8, 502-9, and 502-11. Media content instance 502-1 is filtered out and not included in the third set 610-3 of media content instances.

The third set 610-3 of media content instances may include only media content instances associated with a particular media content category. For example, media content instances included in the third set 610-3 may be associated with a particular media content category, such as a predetermined genre of media content. As an example, category filter 604 may specify a media content category condition that may be applied to select only media content instances associated with a category referred to as "music videos." This may help filter media content based on categorical relevance of the media content. For example, a particular user 118 may be interested in viewing music videos. Examples of other media content categories may include, without limitation, a "song" category, a "news" category, a "comedy" category, a topical category (e.g., a "skateboarding videos" category), etc.

As shown in FIG. 6, ratings filter 606 may be applied to the third set 610-3 of media content instances to select at least a subset of the third set 610-3 of media content instances. Application of ratings filter 606 to the third set 610-3 of media content instances may produce a fourth set 610-4 of media content instances. As shown in FIG. 6, the fourth set 610-4 of media content instances may include media content instances 502-2, 502-8, 502-4, 502-5, 502-9, and 502-11, which are the same media content instances 502-2, 502-4, 502-5, 502-8, 502-9, and 502-11 included in the third set 610-3 of media content instances only rearranged in a different order in accordance with ratings data 218 associated with the media content instances. Thus, in the illustrated example, ratings filter 606 may sort media content instances in accordance with ratings data 218 for the media content instances.

Additionally or alternatively, in some examples ratings filter 606 may selectively filter out one or more media content instances. For example, ratings filter 606 may specify a minimum ratings value condition that may be applied to media content instances to filter out any of the media content instances having end-user-provided ratings that do not satisfy the minimum ratings value condition. Thus, in some examples, the fourth set 610-4 of media content instances may include only media content instances having end-user-provided ratings that satisfy a minimum ratings condition. This may help filter media content based on user-indicated quality of the media content.

As shown in FIG. 6, time allotment filter 608 may be applied to the fourth set 610-4 of media content instances to select a subset of the fourth set 610-4 of media content instances. The selected subset of the fourth set 610-4 of media content instances produced by application of time allotment filter 608 may be referred to as a fifth set 610-5 of media content instances. As shown in FIG. 6, the fifth set 610-5 of media content instances may include media content instances 502-2, 502-8, 502-4, 502-5, and 502-9. Media content instance 502-11 is filtered out and not included in the fifth set 610-5 of media content instances.

The fifth set 610-5 of media content instances may include media content instances that satisfy a predefined time allotment condition. For example, each of the media content instances in the fifth set 610-5 may have a particular playback time. The sum total of the playback times of the media content instances in the fifth set 610-5 may satisfy, without exceeding, a maximum playback time duration condition. Time allotment filter 608 may filter out media content instance 502-11 from the fifth set 610-5 of media content instances in order to keep the sum total of the playback times of the media content instances in the fifth set 610-5 within the maximum playback time duration. Accordingly, media content instances included in the fifth set 610-5 may fit within the maximum playback time duration. In certain embodiments, the maximum playback time duration is based on a length of time spanned by a programming time slot within a media content transmission schedule utilized by distribution subsystem 108 such that the selected subset 610-5 of media content instance has a total playback time that fits within the programming time slot.

By applying ratings filter 606 before applying time allotment filter 608 to a set of media content instances, media content instances that are rated relatively higher than other media content instances may be prioritized for selection to fill a predefined time allotment (e.g., a programming time slot).

One or more of the media content selection operations described herein may utilize metadata 216 associated with media content. For example, platform linking subsystem 114 may access and compare metadata 216 to one or more selection conditions specified by selection heuristic 314 to select media content based on the selection conditions specified by selection heuristic 314. For example, metadata such as location information (e.g., Global Positioning System ("GPS") coordinates), media content category information (e.g., genre information), media content ratings information (e.g., end-user-provided ratings), and playback time information (e.g., a length of playback time) may be compared to selection conditions to select media content based on the selection conditions specified by selection heuristic 314.

Returning now to FIG. 4, in step 404, the selected media content may be published for distribution via a second media content distribution platform. For example, platform linking subsystem 114 may publish the media content selected in step 402 for distribution by distribution subsystem 108. In certain embodiments, the publishing of the selected media content for distribution may include converting the selected media content between media content formats. For example, platform linking subsystem 114 may convert media content from a media content format supported by distribution subsystem 102 to another media content format supported by distribution subsystem 108. Publishing of the selected media content for distribution may further include platform linking subsystem 114 providing (e.g., transmitting) data representative of the selected media content to distribution subsystem 108 for distribution to access subsystems 110. The media content may be converted and/or transmitted to distribution subsystem 108 using any suitable technologies.

Metadata 216 and/or ratings data 218 associated with the selected media content may also be provided (e.g., transmitted) by platform linking subsystem 114 to distribution subsystem 108, which may distribute and/or utilize the metadata 216 and/or ratings data 218 for distribution of the selected media content to one or more access subsystems 110.

Distribution subsystem 108 may be configured to distribute selected media content, as well as related metadata 216 and/or ratings data 218, to one or more access subsystems 110. Accordingly, users 118 may utilize access subsystems 110 to access and experience select media content that has been obtained from distribution subsystem 102 and provided to distribution subsystem 108 by platform linking subsystem 114.

Figure 7:
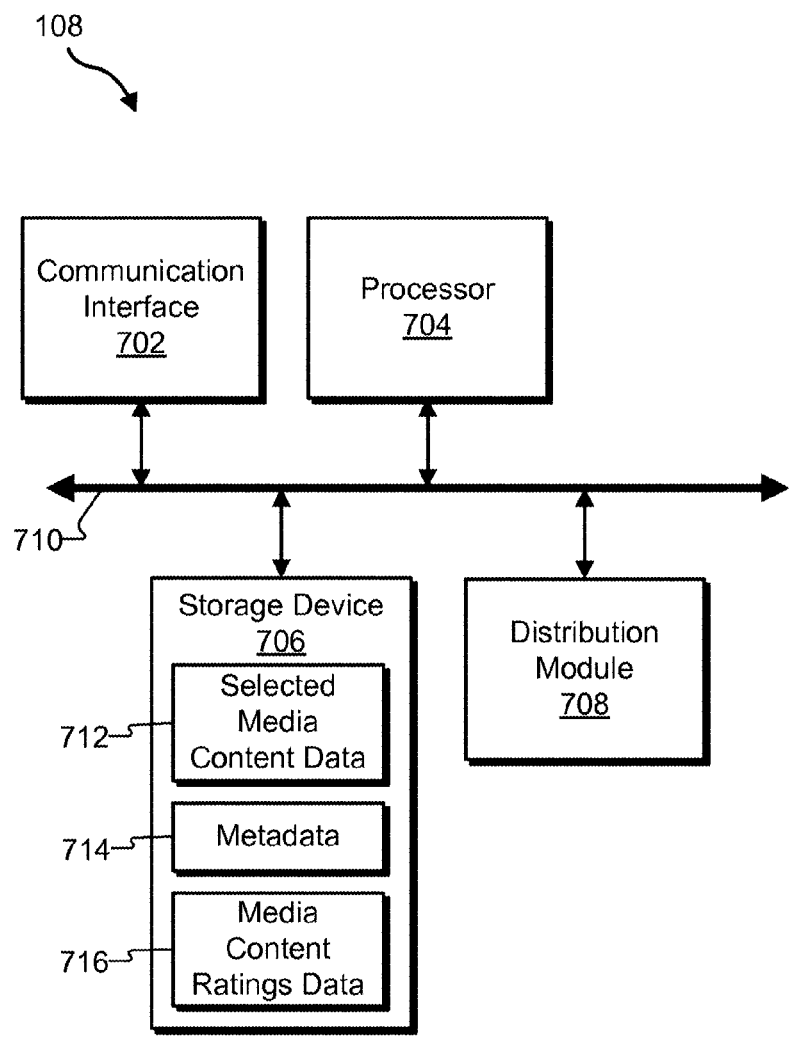
FIG. 7 illustrates exemplary components of a second media content distribution platform subsystem.

FIG. 7 illustrates exemplary components of distribution subsystem 108. As shown in FIG. 7, distribution subsystem 108 may include a communication interface 702, a processor 704, a storage device 706, and a distribution module 708 communicatively coupled one to another via a communication infrastructure 710. The components of distribution subsystem 108 may communicate with one another, including sending data to and receiving data from one another, using any suitable communication technologies. Moreover, the components of distribution subsystem 108 may be implemented on any computing device or combination of computing devices, such as one or more servers, media content transmission devices, or the like.

While an exemplary implementation of distribution subsystem 108 is shown in FIG. 7, the components illustrated in FIG. 7 are not intended to be limiting. Additional or alternative components may be used in other embodiments. Components of the distribution subsystem 108 shown in FIG. 7 will now be described in additional detail.

Communication interface 702 may be configured to communicate with one or more computing devices, including access subsystems 110 and platform linking subsystem 114. In particular, communication interface 702 may be configured to transmit and/or receive communication signals, media content, and/or data to/from access subsystems 110. Examples of communication interface 702 include, without limitation, a wired network interface (such as a network interface card), a wireless network interface (such as a wireless network interface card), a modem, a transmitter, a transceiver, and any other suitable interface.

In some examples, communication interface 702 may be configured to transmit (e.g., broadcast, multicast, and/or narrowcast) data representative of media content to one or more access subsystems 110. Such data may be transmitted in one or more media content streams, as one or more data files, or in any other suitable manner as may serve a particular application. Communication interface 702 may be configured to interface with any suitable communication media, protocols, and formats, including any of those mentioned above.

In certain embodiments, distribution subsystem 108 may be configured to transmit and access subsystems 110 may be configured to receive media content streams carrying data representative of various media content instances in accordance with a transmission schedule. The transmission schedule may specify that particular media content instances are to be transmitted at scheduled transmission times and on certain media content carrier channels. As used herein, the term "scheduled transmission time" or "programming time slot" may refer generally to any period of time during which a media content instance is to be transmitted to one or more access subsystems 110. The term "media content carrier channel" or "content channel" as used herein may refer generally to any carrier of media content, including, but not limited to, media (e.g., television) channels, streams, addresses, frequencies or other carriers of media content. In certain embodiments, the transmission schedule may be associated with a broadcast and/or multicast television service provided by distribution subsystem 108.

In certain embodiments, distribution subsystem 108 may be configured to transmit media content streams carrying data representative of various media content instances to one or more access subsystems 110 in response to requests for the media content instances received from the access subsystem(s) 110. For example, distribution subsystem 108 may provide on-demand media services such as a video-on-demand ("VOD") service.

Processor 704 generally represents any type or form of processing unit capable of processing data or interpreting, executing, and/or directing execution of one or more of the distribution subsystem 108 instructions, processes, and/or operations described herein. Processor 704 may direct execution of operations in accordance with computer-executable instructions (e.g., one or more software applications) such as may be stored in storage device 706 or another computer-readable medium. As an example, processor 704 may be configured to process data, including modulating, encoding, and/or otherwise preparing data (e.g., media content data) for transmission by communication interface 702.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, selected media content data 712, related metadata 714, and related media content ratings data 716 received from platform linking subsystem 114 may be stored in storage device 706. In some examples, data may be arranged in one or more databases residing within storage device 706.

Distribution module 708 may be configured to direct distribution subsystem 108 to prepare media content, including selected media content received from platform linking subsystem 114, for distribution to one or more access subsystems 110. As an example, one or more media content instances received from platform linking subsystem 114 may be inserted into a media-on-demand stream for transmission to one or more access subsystems 110. As another example, one or more selected media content instances received from platform linking subsystem 114 may be assigned to a particular media content carrier channel and/or one or more programming time slots such that the one or more selected media content instances may be distributed to one or more access subsystems 110 in accordance with a media content transmission schedule.

Figure 8:
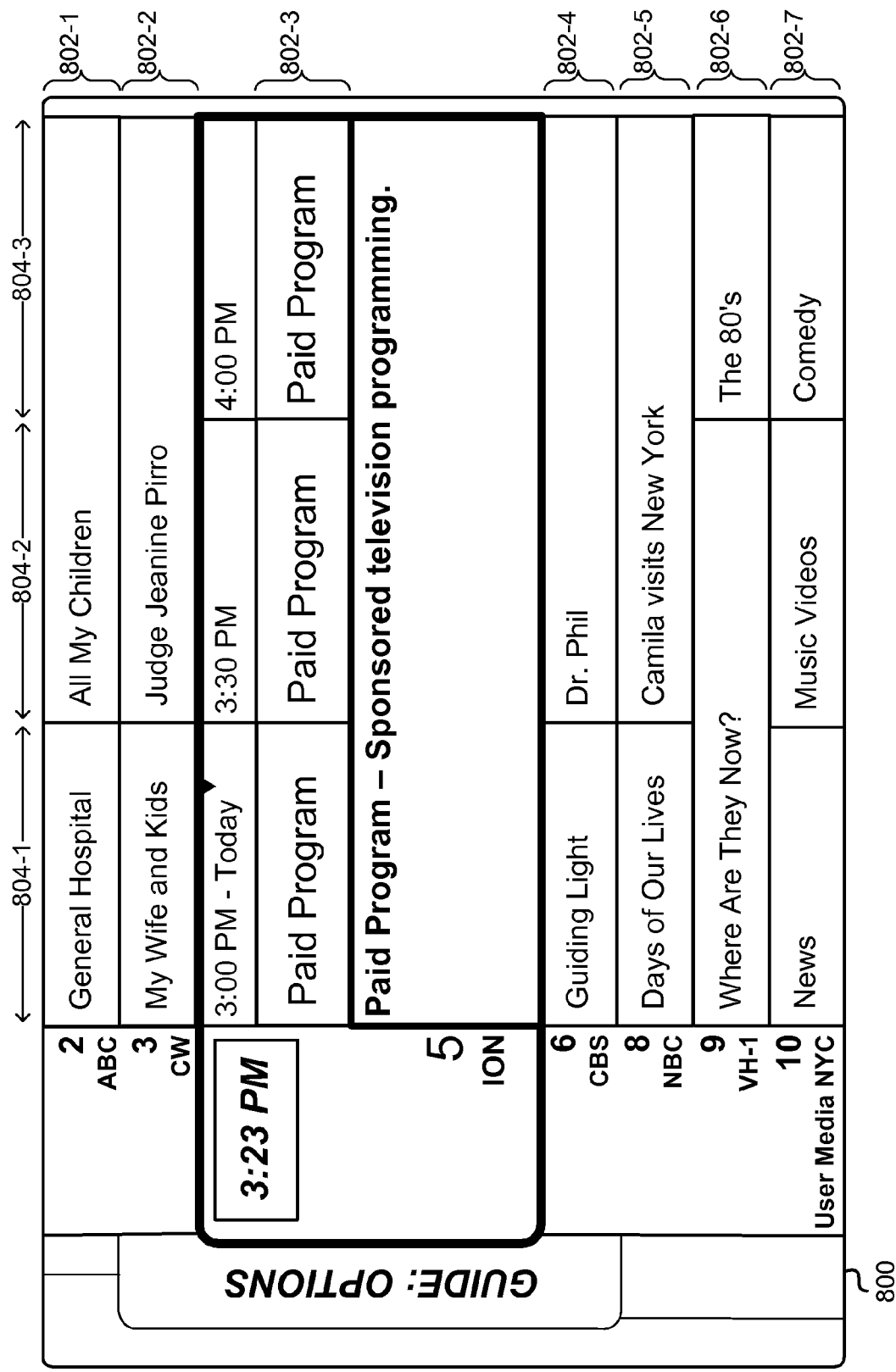
FIG. 8 illustrates an exemplary program guide graphical user interface depicting a media content carrier channel dedicated to distribution of end-user-provided media content.

In certain embodiments, for example, a predetermined media content carrier channel may be dedicated to distribution of selected media content (e.g., end-user-provided media content) received from platform linking subsystem 114 and/or associated with distribution subsystem 102. To illustrate, FIG. 8 shows an exemplary program guide graphical user interface ("GUI") 800 depicting at least a portion of a media content transmission schedule. Program guide GUI 800 may be displayed by an access subsystem 110. As shown, program guide GUI 800 may depict a plurality of media content carrier channels 802 (e.g., media content carrier channels 802-1 through 802-7), programming time slots 804 (e.g., programming time slots 804-1 through 804-3), and media content instances associated with the media content carrier channels 802 and programming time slots 804. A particular media content carrier channel such as media content carrier channel 802-7 may be dedicated to distribution of selected media content received from platform linking subsystem 114 and/or associated with distribution subsystem 102. Thus, media content distributed by another distribution subsystem 102 via another distribution platform may be associated with and distributed via media content carrier channel 802-7 of distribution subsystem 108. Accordingly, a user 118 may utilize an access subsystem 110 to select and tune to media content carrier channel 802-7 to receive and experience selected media content received by distribution subsystem 108 from platform linking subsystem 114. As mentioned, such selected media content may include end-user-provided media content provided by one or more users 116 of access subsystems 104 associated with another media content distribution platform (e.g., distribution platform subsystem 102).

In certain examples, media content carrier channel 802-7 may be labeled in program guide GUI 800 to indicate one or more attributes of the media content distributed via the media content carrier channel 802-7. For example, the label may indicate that the media content is end-user-provided media content, is associated with another distribution platform (e.g., distribution subsystem 102 and/or end-users 116 of access subsystems 104), and/or is associated with a particular geographic location (e.g., "New York City"). For instance, where distribution subsystem 102 distributes media content via a particular media content sharing website, media content carrier channel 802-7 may be labeled to indicate the particular website in program guide GUI 800.

In certain embodiments, a programming time slot 804 associated with media content carrier channel 802-7 may be associated with media content having a particular attribute. For example, media content having a first attribute may be transmitted via media content carrier channel 802-7 during a particular programming time slot, and other media content having one or more other attributes may be transmitted via media content carrier channel 802-7 during another programming time slot. In FIG. 8, for example, in relation to media content carrier channel 802-7, programming time slot 804-1 may be associated with a media content category labeled "News," programming time slot 804-2 may be associated with a media content category labeled "Music Videos," and programming time slot 804-3 may be associated with a media content category labeled "Comedy."

One or more selection heuristics, such as selection heuristic 314, may be applied by platform linking subsystem 114 to media content distributed via one or more distribution platforms (e.g., distribution subsystem 102) as described above to select media content that is relevant to a particular media content carrier channel 802 and/or programming time slot 804. In addition, media content ratings may be used as described above to select top-rated media content for association with a particular media content carrier channel 802 and/or programming time slot 804. Accordingly, a user 118 of an access subsystem 110 may conveniently access top-rated media content (e.g., top-ten music videos as rated by one or more users 116) distributed via another distribution platform (e.g., by distribution subsystem 102), without having to directly access and search through the media content distributed via the other distribution platform.

Access subsystems 110 may be configured to request and/or receive data representative of media content from distribution subsystem 108 via network 112. Access subsystems 110 may process received media content, including presenting (e.g., playing back) the media content for experiencing by users 118. An access subsystem 110 may include or be implemented on one or more devices configured to receive and present media content distributed by distribution subsystem 108. Examples of such devices may include, without limitation, a computing device (e.g., a personal computer), a mobile device (e.g., a mobile phone), a set-top box, a media content recording device (e.g., a DVR device), and any other media content processing device.

In certain implementations, distribution subsystem 108 may comprise a subscriber television content distribution platform subsystem configured to distribute media content via a subscriber television distribution platform. The subscriber television content distribution platform subsystem may receive, from platform linking subsystem 114, selected media content distributed via one or more other media content distribution platforms (e.g., distribution subsystem 102).

Figure 9:
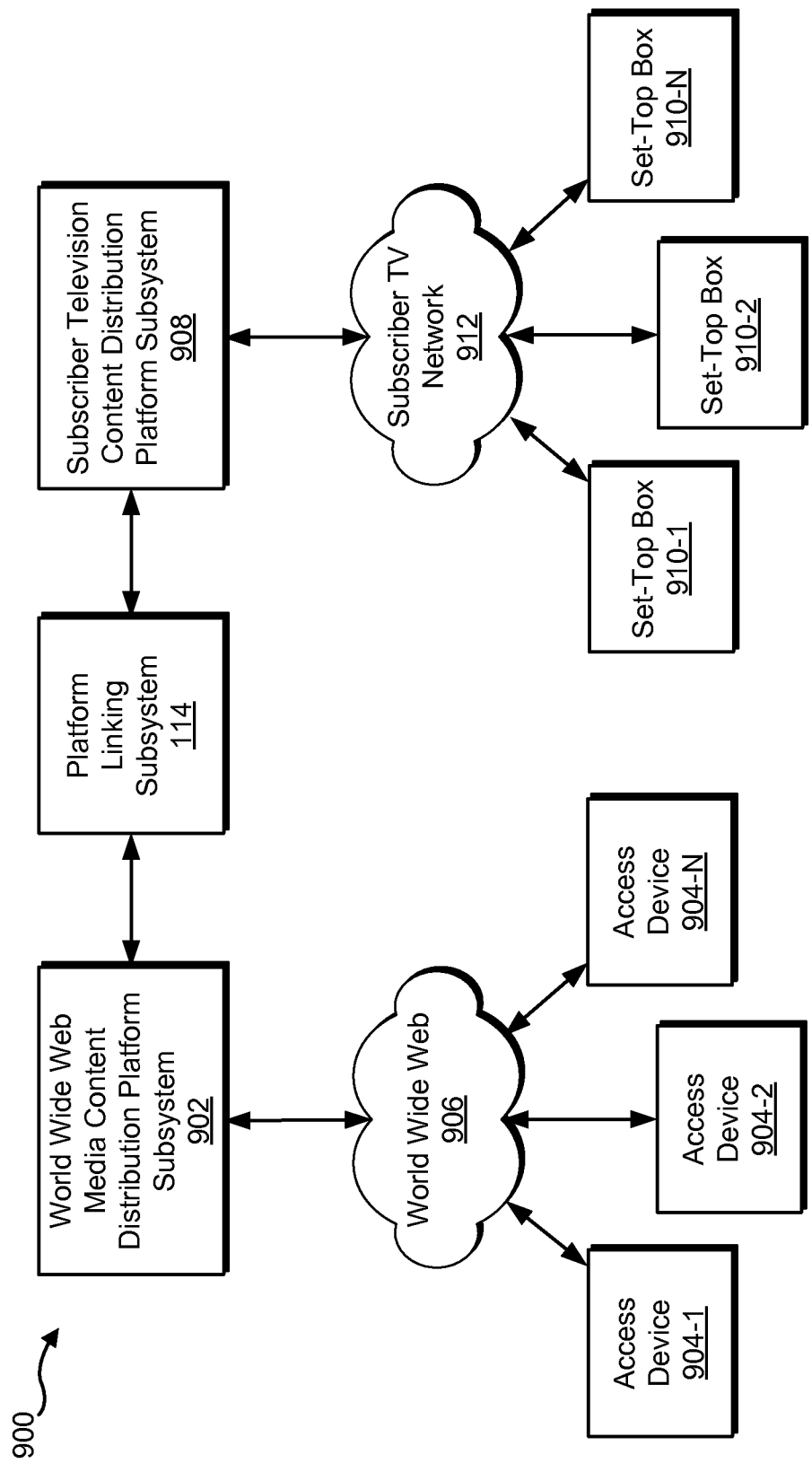
FIG. 9 illustrates another exemplary media content distribution system.

FIG. 9 illustrates another exemplary media content distribution system 900 (or simply "system 900"). System 900 may include a World Wide Web media content distribution platform subsystem 902 (or simply "distribution subsystem 902") in communication with one or more media content access devices 904 (e.g., media content access device 904-1 through 904-N) via at least a portion of the World Wide Web 906, a subscriber television content distribution platform subsystem 908 (or simply "distribution subsystem 908") in communication with one or more set-top boxes 910 (e.g., set-top boxes 910-1 through 910-N) via at least a portion of a subscriber television network 912, and platform linking subsystem 114 in communication with distribution subsystem 902 and distribution subsystem 908.

Components of system 900 may be configured to operate in any of ways described above to provide a link from distribution subsystem 902 to distribution subsystem 908. Accordingly, media content distributed by distribution subsystem 902 to one or more access devices 904 (e.g., one or more personal computers) via the World Wide Web 906 may be selected and published to distribution subsystem 908 for distribution by distribution subsystem 908 to one or more set-top boxes 910 via subscriber television network 912. In certain embodiments, system 900 may be an implementation of system 100.

Figure 10:
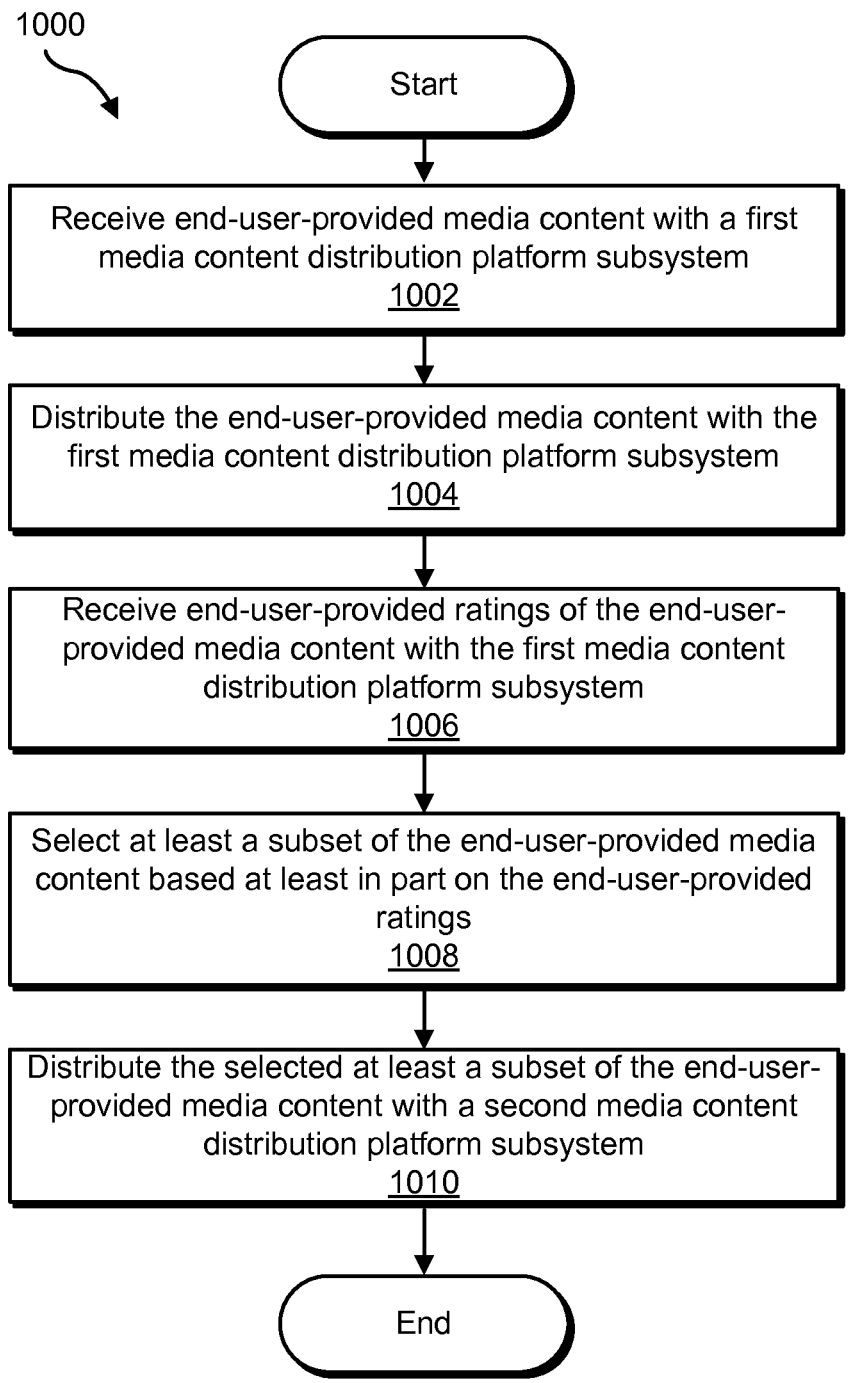
FIG. 10 illustrates an exemplary media content distribution method.

FIG. 10 illustrates an exemplary media content distribution method 1000. While FIG. 10 illustrates exemplary steps according to one embodiment, other embodiments may omit, add to, reorder, and/or modify any of the steps shown in FIG. 10. In certain embodiments, one or more of the steps shown in FIG. 10 may be performed by one or more components of system 100 or system 900.

In step 1002, end-user-provided media content is received with a first media content distribution platform subsystem. For example, distribution subsystem 102 may receive end-user-provided media content from one or more access subsystems 104 via network 106. Step 1002 may be performed in any of the ways described above.

In step 1004, the end-user-provided media content is distributed with the first media content distribution platform subsystem. For example, distribution subsystem 102 may distribute the end-user-provided media content to one or more access subsystems 104 via network 106. Step 1004 may be performed in any of the ways described above.

In step 1006, end-user-provided ratings of the end-user-provided media content are received with the first media content distribution platform subsystem. For example, distribution subsystem 102 may receive end-user-provided ratings of the end-user-provided media content from one or more access subsystems 104. Step 1006 may be performed in any of the ways described above.

In step 1008, at least a subset of the end-user-provided media content is selected based at least in part on the end-user-provided ratings. For example, platform linking subsystem 114 may access and automatically select at least a subset of the end-user-provided media content distributed by distribution subsystem 102. The selection may be based at least in part on the end-user-provided ratings as described above. Additionally or alternatively, the selection may be based on at least one other predefined selection condition specified by a selection heuristic such as selection heuristic 314. Step 1008 may be performed in any of the ways described above.

In step 1010, the selected at least a subset of the end-user-provided media content may be distributed with a second media content distribution platform subsystem. For example, platform linking subsystem 114 may provide the selected at least a subset of the end-user-provided media content to distribution subsystem 108, which may distribute the selected at least a subset of the end-user-provided media content to one or more access subsystems 110 via network 112. Distribution subsystem 108 may also distribute metadata and/or ratings data associated with the selected media content to one or more access subsystems 110. Step 1010 may be performed in the ways described herein.

In certain embodiments, one or more components of system 100 or system 900 may be configured to append advertising content to media content for distribution by distribution subsystem 108 to one or more access subsystems 110. For example, platform linking subsystem 114 and/or distribution subsystem 108 may append an advertisement to a media content instance such that in conjunction with presentation of the media content instance for experiencing by a user 118, the advertisement may be presented for experiencing by the user 118. Advertising content may be appended to media content using any suitable technologies.

In some examples, one or more advertisers may submit bids for placement of advertising content. To this end, one or more components of system 100 or system 900 may be configured to receive and process data representative of bids for placement of advertising content. Accordingly, advertising content may be appended to media content based at least in part on ad placement bids. For example, one or more components of system 100 or system 900 may select and append advertising content associated with a high bid for placement with media content.

In certain embodiments, fees for placement of advertising content may be charged to one or more advertisers. The fees may correspond with bids for placement of advertising content in some example.

Revenues from the fees may be divided between one or more parties, including an operator of distribution subsystem 102 and a user 116 who provided media content. Accordingly, users 116 may be incentivized to create and provide quality media content that may be rated and selected for distribution by distribution subsystem 108. To this end, one or more components of system 100 or system 900 may be configured to track fees for placement of advertising content, as well as predefined divisions of revenues from the fees between various parties.

Figure 11:
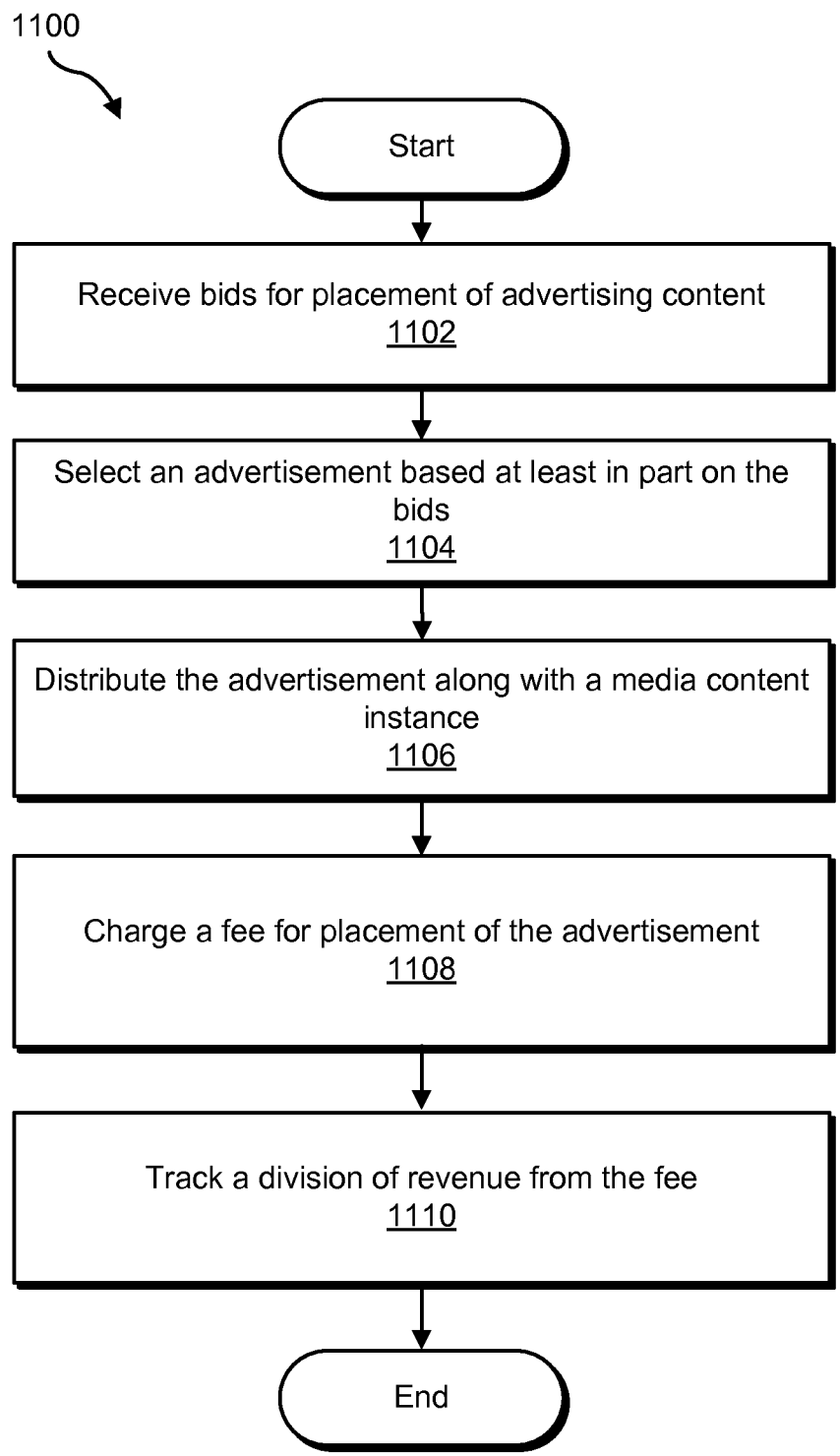
FIG. 11 illustrates an exemplary advertisement content distribution method.

FIG. 11 illustrates an exemplary an exemplary advertisement distribution method 1100. While FIG. 11 illustrates exemplary steps according to one embodiment, other embodiments may omit, add to, reorder, and/or modify any of the steps shown in FIG. 11. In certain embodiments, one or more of the steps shown in FIG. 11 may be performed by one or more components of system 100 or system 900.

In step 1102, bids for placement of advertising content are received. For example, one or more components of system 100 or system 900 may receive data representative of bids for placement of advertising content from one or more advertisers.

In step 1104, an advertisement is selected based at least in part on the bids received in step 1102. For example, one or more components of system 100 or system 900 may select an advertisement from advertising content based at least in part on the bids, such as by selecting an advertisement associated with a bid having a highest value. Additionally or alternatively, a selection of an advertisement in step 1104 may be based on one or more other criteria, such as a context within which an advertisement is being selected, a relationship of an advertisement to media content, a relationship of an advertisement to a category of media content, etc.

In step 1106, the advertisement is distributed along with a media content instance. For example, distribution subsystem 108 or distribution system 908 may distribute the advertisement selected in step 1104 along with a media content instance to one or more access subsystems 110 or set-top boxes 910, respectively.

In step 1108, a fee is charged for placement of the advertisement. For example, one or more components of system 100 or system 900 may charge a predefined fee to an advertiser for placement (e.g., distribution) of the advertisement.

In step 1110, a division of revenue from the fee is tracked. For example, one or more components of system 100 or system 900 may track a predefined division of revenue between two or more parties (e.g., between a user who generated and/or provided the media content instance and an operator of distribution subsystem 108 or distribution subsystem 908).

While one or more of the examples described above are directed to selecting media content distributed by a first media content platform subsystem based on end-user-provided ratings of the distributed media content, this is illustrative only and not limiting in any sense. A selection of media content distributed by a first media content distribution platform for publishing to a second media content platform subsystem for distribution by the second media content platform subsystem may be based on one or more of a variety of conditions as may suit a particular implementation. Examples of such conditions may include, without limitation, a media content ratings condition (e.g., an end-user-provided ratings condition), a media content popularity condition (e.g., a number of times that a media content instance has been downloaded and/or otherwise accessed), a maximum playback time condition, a media content category condition, a geographic location condition, a media content creation date condition, a media content posting date condition (e.g., a date a media content instance is posted to to the first media content distribution platform subsystem), and a recent activity condition (e.g., a number of times that a media content instance has been downloaded or otherwise accessed, reviewed, etc. within a recent time period), or a combination or sub-combination of such conditions. Any of these conditions and/or other suitable conditions, or combinations or sub-combinations thereof, may be defined in selection heuristic 314 as described above and used to score and select media content distributed by a first media content distribution platform subsystem to be published to a second media content distribution platform subsystem for distribution.

Accordingly, a platform linking subsystem communicatively coupled to a first media content distribution platform subsystem and a second media content distribution platform subsystem may convert at least a subset of end-user-provided media content distributed by the first media content distribution platform subsystem from a media content format supported by the first media content distribution platform to another media content format supported by the second media content distribution platform and publish the converted at least a subset of the end-user-provided media content for distribution by the second media content distribution platform subsystem. The at least a subset of end-user-provided media content may be selected by the platform linking subsystem for publication to the second media content distribution platform subsystem based on any of the one or more conditions described above, which may be specified by selection heuristic 314.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving end-user-provided media content with a World Wide Web media content distribution platform;
distributing the end-user-provided media content via the World Wide Web media content distribution platform;
receiving end-user-provided ratings of the distributed end-user-provided media content with the World Wide Web media content distribution platform;
automatically selecting, by a platform linking subsystem based at least in part on the end-user provided ratings and without end-user input, at least a subset of the end-user-provided media content distributed via the World Wide Web media content distribution platform first; and
transmitting data representative of the selected at least a subset of the end-user-provided media content to a subscriber television content distribution platform.

2. The method of claim 1, wherein the World Wide Web media content distribution platform subscriber television content distribution platform utilize diverse media content distribution platforms to distribute the end-user-provided media content and the selected at least a subset of the end-user-provided media content.

3. The method of claim 1, wherein the automatically selecting of the at least a subset of the end-user-provided media content is further based on a time allotment condition for the selected at least a subset of the end-user-provided media content.

4. The method of claim 3, wherein the time allotment condition defines a maximum playback duration for the selected at least a subset of the end-user-provided media content.

5. The method of claim 4, wherein the maximum playback duration is based on a length of time spanned by a programming time slot within a media content transmission schedule utilized by the subscriber television content distribution platform.

6. The method of claim 1, wherein the automatically selecting of the at least a subset of the end-user-provided media content is further based on at least one of a media content category condition and a geographic location condition for the selected at least a subset of the end-user-provided media content.

7. The method of claim 1, wherein the selected at least a subset of the end-user-provided media content comprises a subset of the end-user-provided media content having relatively higher-value end-user-provided ratings than a remainder of the end-user-provided media content.

8. The method of claim 1, wherein the automatically selecting comprises utilizing metadata associated with the end-user-provided media content to select the at least a subset of the end-user-provided media content.

9. The method of claim 1, further comprising:
receiving bids for placement of advertising content;

selecting an advertisement from the advertising content based at least in part on the bids for placement of the advertisement content;
appending the advertisement to the selected at least a subset of the end-user-provided media content; and
distributing, by the subscriber television content distribution platform, the advertisement with the selected at least a subset of the end-user-provided media content.

10. The method of claim 9, further comprising:
charging a fee for placement of the advertisement; and
tracking a division of revenue from the fee between at least one user who provided the selected at least a subset of the end-user-provided media content and an operator of the subscriber television content distribution platform.

11. The method of claim 1, tangibly embodied as computer-executable instructions on at least one computer-readable medium.

12. A system comprising:
a World Wide Web media content distribution platform that receives and distributes end-user-provided media content and end-user-provided ratings of the end-user-provided media content via the World Wide Web media content distribution platform;
a subscriber television content distribution platform diverse from the World Wide Web media content distribution platform; and
a platform linking subsystem communicatively coupled to the World Wide Web media content distribution platform and the subscriber television content distribution platform, the platform linking subsystem configured to
automatically select, based at least in part on the end-user-provided ratings of the end-user-provided media content and without end-user input, at least a subset of the end-user-provided media content distributed via the World Wide Web media content distribution platform, and
publish the selected at least a subset of the end-user-provided media content for distribution via the subscriber television content distribution platform.

13. The system of claim 12, wherein the subscriber television content distribution platform distributes the selected at least a subset of the end-user-provided media content by at least one of broadcasting and multicasting the selected at least a subset of the end-user-provided media content to a plurality of set-top boxes.

14. A method comprising:
receiving end-user-provided media content with a World Wide Web media content distribution platform;
distributing the end-user-provided media content via the World Wide Web media content distribution platform;
receiving end-user-provided ratings of the distributed end-user-provided media content with the World Wide Web media content distribution platform;
automatically selecting, by a platform linking subsystem without end-user input, a subset of the end-user-provided media content distributed via the World Wide Web media content distribution platform;
transmitting, by the platform linking subsystem, the selected subset of the end-user-provided media content to a subscriber television content distribution platform; and
distributing the selected subset of the end-user-provided media content to one or more media content access subsystems via the subscriber television content distribution platform;
wherein the automatically selecting of the subset of the end-user-provided media content is based at least in part on
the subset of the end-user-provided media content having relatively higher-value end-user-provided ratings than a remainder of the end-user-provided media content, and
at least one of a maximum playback duration, a media content category condition, and a geographic location condition for the selected subset of the end-user-provided media content.

15. The method of claim 1, further comprising distributing the data representative of the selected at least a subset of the end-user-provided media content to one or more media content access subsystems via the subscriber television content distribution platform.

16. The method of claim 15, wherein the distributing of the data representative of the selected at least a subset of the end-user-provided media content via the subscriber television content distribution platform comprises transmitting the selected at least a subset of the end-user-provided media content via a predetermined media content carrier channel with the subscriber television content distribution platform.

17. The method of claim 16, wherein the transmitting the selected at least a subset of the end-user-provided media content via the predetermined media content carrier channel comprises at least one of broadcasting and multicasting the selected at least a subset of the end-user-provided media content via the predetermined media content carrier channel.

* * * * *